United States Patent Office 2,795,999
Patented June 18, 1957

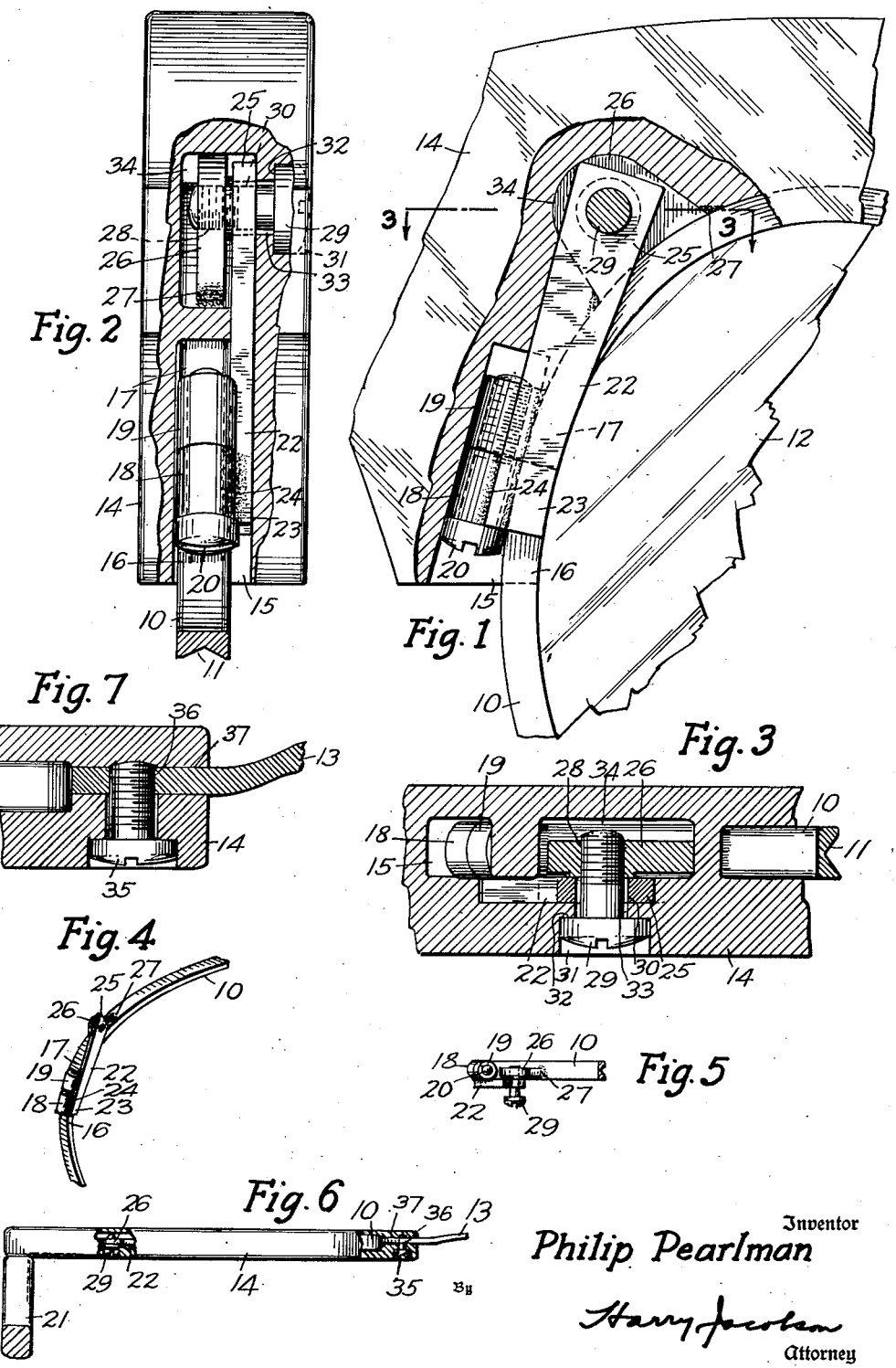

2,795,999

SAFETY LOCK FOR SPECTACLE EYE WIRES

Philip Pearlman, Bronx, N. Y.

Application November 3, 1953, Serial No. 389,985

5 Claims. (Cl. 88—47)

This invention relates to spectacle frames and particularly to the metallic eye wires used in certain types of such frames.

The eye wires encircling the lens-receiving openings of spectacles are usually split to permit the insertion and removal of the lenses, the ends of each eye wire being detachably fastened together by means of a screw passing through a barrel or tube soldered to one end portion of the eye wire and into a second internally threaded barrel or tube soldered to the other end portion of the eye wire. In use, however, the screw frequently becomes sufficiently loose to permit the ends of the eye wire to open up, separate or spread apart to a substantial extent. If the screw is not tightened when it begins to loosen in its tube, it may soon become loose enough to allow the lens to fall out of the eye wire frame or lens opening, there being nothing to prevent the eye wire from opening up nor to prevent the lens opening from enlarging.

The present invention therefore contemplates the provision of a simple and economical auxiliary safety lock becoming operative to prevent the adjacent end portions of the eye wire from separating should the screw normally holding said ends together become loose.

The invention further contemplates the provision of an auxiliary lock for the respective end portions of the eye wire, said lock functioning as well for holding the temporal end of the recessed plastic brow member to the top part of the eye wire, whereby one end of the brow member is removably held in place by the same auxiliary means which insures against accidental opening of the eye wire, the lock being normally concealed in the interior of the brow member.

The various objects of the invention will be clear from the description which follows and from the drawings, in which Fig. 1 is a fragmentary rear elevational view of the temporal end of a spectacle frame showing the auxiliary lock for fastening together the end portions of an eye wire.

Fig. 2 is a fragmentary side elevational view of the frame end, part of the brow member being broken away and sectioned to show the interior parts and recesses.

Fig. 3 is a horizontal sectional view of the auxiliary or secondary fastening means or lock, taken on the line 3—3 of Fig. 1.

Fig. 4 is a fragmentary perspective view of part of the secondary means or lock for holding together the end portions of the eye wire, the screws and the brow member being omitted.

Fig. 5 is a fragmentary top plan view of the primary means and of the auxiliary or secondary means for holding the end portions of the eye wire together.

Fig. 6 is a top plan view of part of a spectacle frame to which the invention has been applied, the brow member being broken away to show the securing means therefor.

Fig. 7 is a fragmentary horizontal sectional view similar to Fig. 3, of the nasal end portion of the brow member and of the means for securing said end portion to the eye wire.

In the practical embodiment of the invention shown by way of example, the eye wire 10 is grooved as at 11 in the usual manner to receive the peripheral portion of the lens 12. The eye wire for one eye is joined to the corresponding eye wire for the other eye as by means of the metallic bridge 13, which is preferably soldered to the outer surfaces of the eye wires. At the top portion of each of the eye wires, is a brow member 14 which is provided with a suitable recess in its inner edge for the reception of the eye wire and is additionally recessed as at 15 for the reception of the primary means for detachably securing together the end portions 16 and 17 of the split eye wire at the split. Said primary fastening or securing means comprises the lower barrel or tube 18 suitably soldered to the outer surface of the end portion 16 of the eye wire, the internally threaded upper barrel or tube 19 soldered to the other end portion 17 of the eye wire, and the screw 20 passing loosely through the lower tube 18 and screwed into the upper tube 19. At the temporal end of the brow member 14 is hinged the temple 21. Up to this point, the frame parts referred to by reference numerals are known in the art.

One of the important novel features of the present invention is the provision of the relatively thin metallic elongated auxiliary or safety arm, link or strap member 22, the lower end 23 of which is soldered as at 24 to the lower tube 18 or to the lower portion 16 of the ends of the eye wire or to both the tube 18 and the part 16. The safety member 22 extends upwardly past the upper tube 19 to bring the upper end 25 of the safety member into position to be detachably connected to a suitable extension 26 on the outer surface of the upper part of the eye wire above the end portion 17, said end 25 being normally in spaced relation to the eye wire.

As shown, the extension 26 takes the form of a lug of lesser thickness than the width of the eye wire, and is soldered to the outer face of said eye wire as at 27, the lug being perforated with an internally threaded hole 28 to receive the screw 29. A hole 30 in the upper end 25 of the safety member 22 permits the free passage of the screw 29 through the member. As best seen in Figs. 2 and 3, the hole in the brow member for the screw is countersunk or recessed at 31 for the reception of and to fit the head of the screw, the shank of the screw passing loosely through the hole 33. Obviously, when the screw is tightened against the upright wall 32 at the end of the countersunk part 31, the lug 26 and the wall 32 are pulled together with the upper end portion 25 of the safety member arranged and held therebetween.

The brow member is also internally recessed as at 34 to receive the lug 26 and the end portion 25 of the safety member therein. Said recess 34 communicates with the groove 11 and the recess 15, whereby the eye wire, tubes 18 and 19, and the safety member 22 may readily be inserted by a simple and easy movement into the respective grooves provided for them in the brow member to be concealed in the interior of the brow member and to become arranged in the proper positions for the insertion of the screw 29 into the holes 33, 30 and 28.

It will now be seen that should the screw 20 of the primary fastening means for the end portions of the eye wire become loose or fall out, said end portions 16 and 17 of the eye wire are nevertheless held firmly together by the safety member 22, which consequently serves as a secondary or auxiliary means to maintain the size of the lense-receiving opening in the eye wire against accidental increase until the screw 29 is deliberately removed and the safety member 22 thereby released. It will further be seen that said screw serves the additional function of holding the temporal end of the brow member 14 firmly in position relatively to the eye wire.

The nasal end of the brow member is held removably to the bridge 13 by the screw 35 (Figs. 6 and 7) passing into a suitable threaded hole 36 in the bridge. The brow member is suitably recessed as at 37 for the reception of the side edge portion of the bridge in a manner which is well understood. The screw 35 holds the nasal end of the brow member to the bridge and cooperates with the screw 29 to provide a detachable connection whereby the brow member may be readily removed together with the temple 21 as a unit on the removal of said screws 29 and 35.

It will be seen that by the provision of the secondary fastening means, loss of or damage to the lens 12 due to the loss of or loosening of the screw 20 of the primary fastening means, is adequately prevented in an efficient and economical manner without materially increasing the effort involved in inserting, removing or changing lenses.

While certain specific embodiments of the invention have herein been shown and described, various obvious changes may be made therein without departing from the spirit of the invention defined in the appended claims.

I claim:

1. The combination with the eye wire of a spectacle frame, said eye wire having separable end portions, of means for detachably securing said end portions together to form a lens-receiving opening within the eye wire comprising upper and lower tubes secured to the respective end portions and a first screw connecting the tubes, and auxiliary means including a safety member secured to the lower tube and detachably secured to the other of said end portions at a point in upward spaced relation to the upper tube to hold said portions together against separation and to prevent enlargement of the lens-receiving opening on the failure of the first-mentioned means to hold said end portions together, the safety member being secured at the lower end thereof to the lower end portion of the eye wire and being movable as a unit therewith and extending upwardly past the upper tube, said member having a hole therethrough at the upper end thereof extending from the rear face through the front face thereof, an extension on the eye wire having an internally threaded hole therein and arranged coaxially of the hole in the member, a second screw passing through the hole in the member and into the threaded hole of the extension, a brow member of plastic material provided with a groove in an edge thereof, said groove receiving the upper part of the eye wire, the brow member being provided with recesses between the front and rear faces thereof for the reception of the securing means and for the reception of the auxiliary means in the interior of the brow member for concealment by the brow member, the recesses being open at the inner and lower edges of the brow member and closed at the outer edge and top of the brow member, the brow member having a countersunk hole therein for the second screw adapted to be arranged coaxially of the holes hereinbefore mentioned, the safety member being arranged in a recess of the brow member between the extension and the inner end of the hole in the brow member whereby tightening of the screw positively locks the brow member to the extension with the safety member locked between the brow member and the extension.

2. In a spectacle frame, an eye wire having separable end portions, primary means for holding the end portions detachably together including a first screw, secondary means for locking the end portions together against relative movement on the loosening of the screw and comprising a safety member extending a substantial distance upwardly past the top of the screw and permanently joined to the lower of said end portions and movable as a unit therewith, and a screw connection between the member and the upper of said portions at a point in upward spaced relation to the top of the first screw, and a temple-carrying brow member receiving the upper part of the eye wire, the safety member being normally arranged in the interior of the brow member, the screw connection including a second screw passing from front to rear through the safety member and having an operative connection to the upper end portion of the eye wire and engaging and urging the brow member toward the safety member and said upper end portion.

3. In a spectacle frame having a split eye wire and a brow member provided with a groove receiving the upper part of the eye wire, the brow member having a slot at the temporal end thereof open at the bottom and inner edge of the brow member and closed at the top and outer edge, the front and rear parts of the brow member forming the walls of the slot and being imperforate, primary means detachably securing the end portions of the eye wire to each other and comprising a first axially perforated member on one end portion, a second axially perforated member on the other end portion and a first screw connecting said portions, and second means concealed from view by and arranged in the slot in the interior of the brow member at the temporal end of the brow member for detachably securing said end portions of the eye wire to each other, said means being operative to hold the perforated members positively against separation from each other and from the slot of the brow member regardless of the removal of the first screw, the concealed secondary means comprising an elongated plate-like safety member permanently secured to one of the end portions adjacent said first perforated member and movable therewith as a unit and etxending upwardly past said second perforated member to a point in spaced relation to the upper part of the eye wire, a lug on the eye wire arranged in front of the upper end of the safety member and a second screw fastening the brow member, the elongated safety member and the lug together and extending from the rear of the brow member through the safety member and through the lug and into the top of the recess.

4. In a spectacle frame, an eye wire having a split therein at the temporal side thereof, an upper internally threaded tube secured at the split to the upper end part of the eye wire, a plastic brow member terminating at the temporal end thereof at a point adjacent the lower end of the lower tube and having an inner groove therein receiving the upper part of the eye wire, said brow member having a recess therein between the front and rear faces thereof and extending upwardly from the lower temporal end thereof past the tubes and also extending from the inner groove thereof outwardly toward the outer edge thereof, said recess terminating inwardly of the outer edge of said temporal end of the brow member to provide an imperforate outer edge at said temporal end, said brow member having a perforation therein extending from the rear face thereof forwardly into the upper part of the recess at a point in upward spaced relation to the upper tube, a lug extending outwardly from the eye wire at said last mentioned point and entering the upper part of said recess above the upper tube, said lug having an inwardly threaded hole therein arranged coaxially of the hole in the brow member, a screw securing the tubes together, and means detachably securing the lower tube to the lug and also detachably securing the lug and the eye wire to the brow member comprising an elongated strap member having a perforation at the upper end thereof arranged coaxially of the perforation in the brow member and the hole in the lug, the strap member extending to the upper part of the recess in the brow member and being enclosed by said brow member, means permanently securing the lower end of the strap member to the lower tube and a screw passing through the perforations of the brow member and the strap member and screwed into the hole in the lug.

5. In a spectacle frame, an eye wire having separable end portions, a first screw holding said ends portions against separation from each other, a brow member receiving the upper portion of the eye wire and having a temporal portion projecting beyond the temporal side of the eye wire, said temporal portion having a slot therein between the front and rear faces thereof for the reception and concealment of said screw and the end portions of the eye wire, a plate-like safety member in the slot between the front and rear faces of the temporal portion and extending to the top part of the slot, said safety member functioning independently of said screw and of the brow member to hold said end portions of the eye wire against separation, means securing the lower end of the safety member to the lower end portion of the eye wire, said safety member being free of and extending upwardly past the upper end of the first screw, a lug on the eye wire at the upper part of the slot beyond the first screw and arranged between the front and rear walls of the slot, and a second screw passing forwardly from the rear through the rear wall of the brow member, through the safety member and into the lug.

References Cited in the file of this patent

UNITED STATES PATENTS

| | | |
|---|---|---|
| 1,882,153 | Lobenstein | Oct. 11, 1932 |
| 2,577,380 | Stegeman | Dec. 4, 1951 |
| 2,655,835 | Salierno | Oct. 20, 1953 |
| 2,682,199 | Weissman | June 29, 1954 |

FOREIGN PATENTS

| | | |
|---|---|---|
| 12,794 | Great Britain | of 1915 |